Patented Feb. 20, 1934

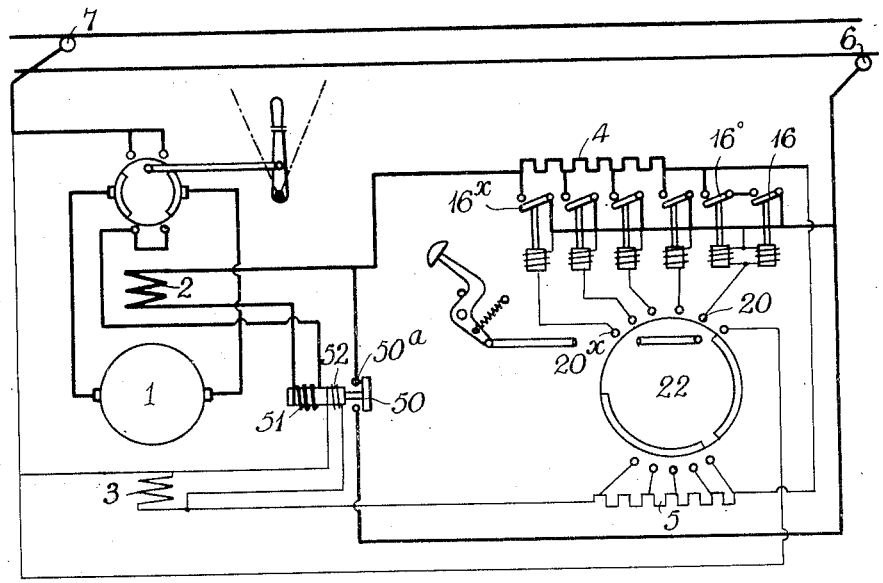
Fig:1.
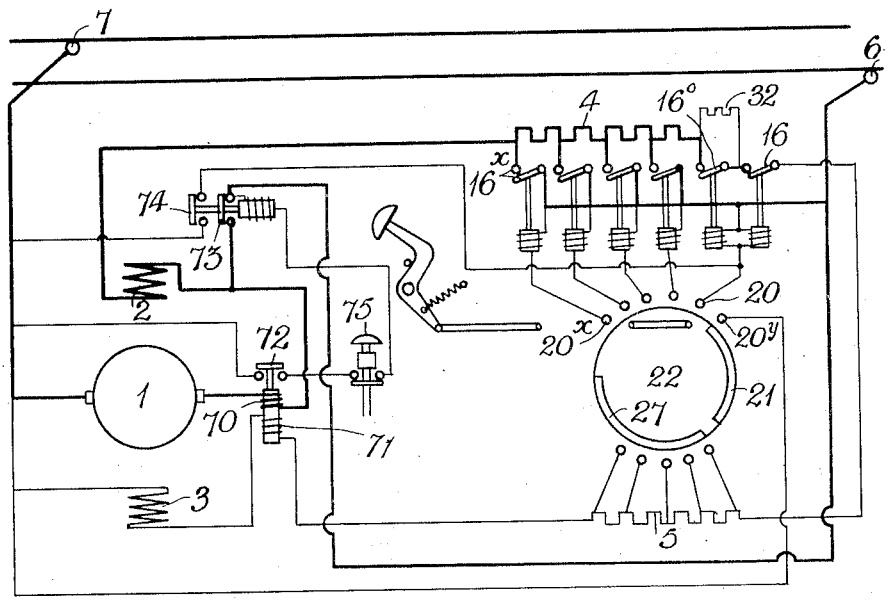
Fig:3.

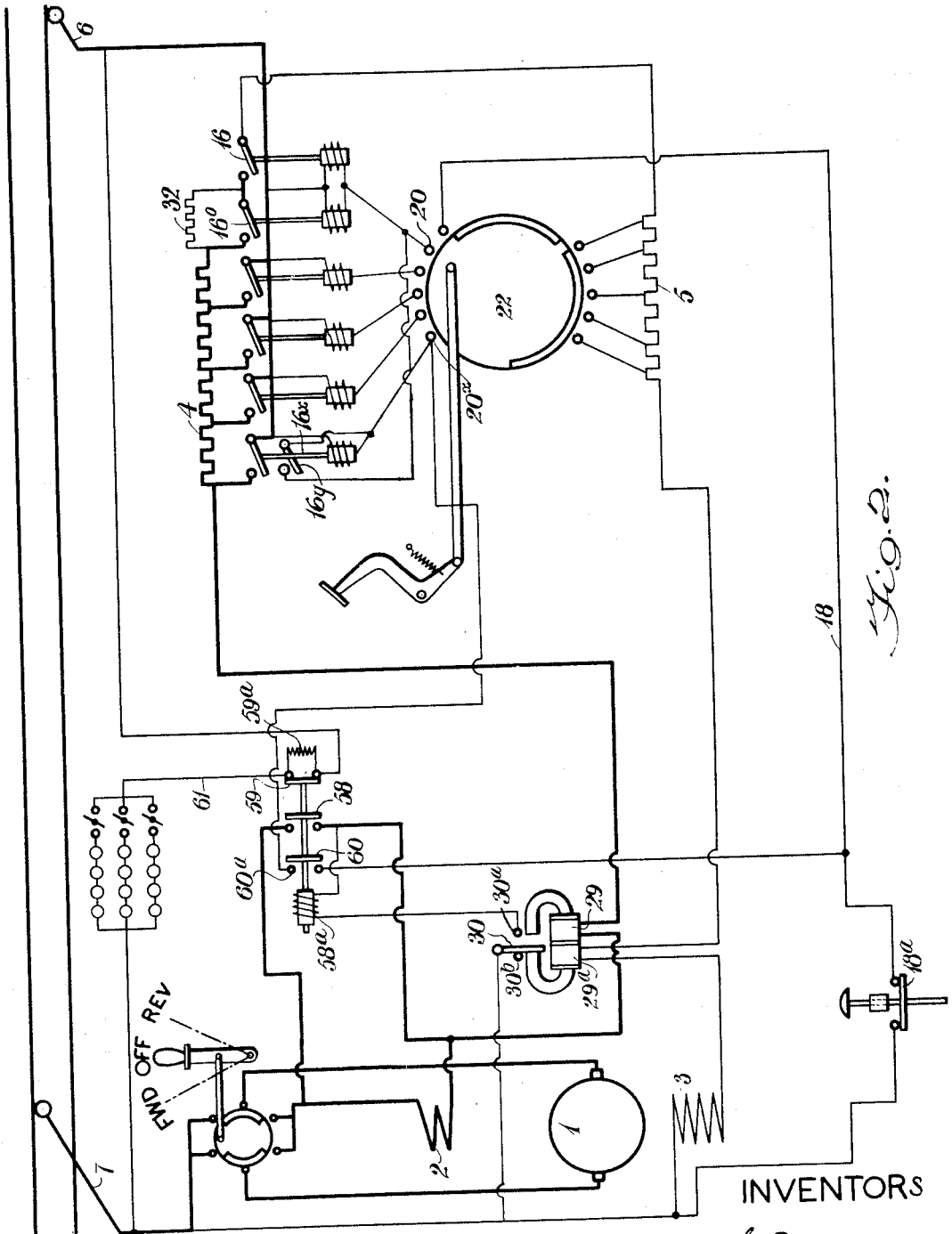

1,948,376

UNITED STATES PATENT OFFICE 1,948,376

ELECTRICALLY DRIVEN VEHICLE

Sydney Slater Guy, Wolverhampton, and William Arthur Stevens, Maidstone, England Original application May 29, 1930, Serial No. 457,304, and in Great Britain August 6, 1929. Divided and this application July 22, 1932. Serial No. 624,266

4 Claims. (Cl. 172—179)

This application is filed as a division of our prior application Ser. No. 457,304, filed May 29, 1930 for Electrically driven vehicles.

This invention relates to electrically driven vehicles in which the dynamo-electric machines are of the compound wound or regenerative type and in which the series and shunt field windings have in series therewith resistances that can be progressively cut in or out of circuit by a controller drum actuated by a spring loaded power pedal.

The object of the present invention is to provide means whereby the control of the system for the purposes of regeneration is secured automatically and independently of the angular position of the controller drum so that if, when the vehicle is descending a gradient or travelling at speed, and the driver takes his foot off the power pedal and the controller drum in consequence returns to the "off" position under the influence of the pedal spring, the circuits maintaining regeneration are automatically closed, the machine then commencing to return current back to supply and exerting a braking effect on the vehicle until such time as the speed of the latter is so reduced that the voltage of the generated current falls below that of supply.

A further object of the invention is to arrange the electrical connections so that when the machine commences to act as a generator the current is automatically diverted from the series field winding.

Means are also provided whereby the circuits can be automatically broken immediately the mechanical brakes are applied so that it will be impossible for the driver to apply power and braking at the same time.

In the accompanying drawings,

Figure 1 illustrates, diagrammatically, one method of keeping the circuits closed during regeneration.

Figure 2 illustrates, diagrammatically, an alternative method of maintaining the circuits closed during regeneration.

Figure 3 shows, also diagrammatically, a further modification of the invention in which the current is automatically diverted from the series field winding during regeneration.

Referring to the drawings, 1 is the armature of a compound wound dynamo-electric machine, the series and shunt field windings 2, 3 of which have variable resistances 4 and 5 which are connected in series therewith respectively and are controlled by a starting and speed changing resistance controller drum 22 operated by a power pedal. The circuit is completed through contactors 16—16$^x$ which are respectively connected with stationary contacts 20—20$^x$ in the known manner.

The arrangement shown in Figure 1 involves the provision of a polarized contactor 50, the heavy winding 51 of which is inserted in circuit with the end of the series winding 2 nearest armature 1, whilst the fine wire coil 52 is connected either in shunt or in series with the shunt field winding 3. The top contact 50$^a$ of the switch is connected with the lead from the series field winding 2 to the series resistance 4, whilst the switch arm is connected to trolley pole 6.

When the vehicle is travelling at speed and the power pedal is released, the machine commences to act as a generator and closes the contactor 50 by the voltage generated through the shunt field path. This completes the circuit through the armature of the machine and the series field winding across the supply poles 6 and 7. When, in consequence of the resulting electrical braking effect, the speed of the vehicle is reduced to such an extent that the voltage at the terminals of the machine falls below that of the line the contactor automatically opens and breaks the said circuit.

Another arrangement whereby the circuits of electrically driven vehicles capable of regeneration are automatically kept closed during the whole time the dynamoelectric machine is acting as a generator, is shown in Figure 2 and involves the provision of a reverse current relay having two windings 29, 29$^a$ connected in circuit with the series and shunt windings 2, 3 respectively. In this case the contact 30$^a$ is connected with the exciting coil 58$^a$ of a main contactor switch 58. Associated with this switch and closing at the same time is an auxiliary switch 60, one terminal 60$^a$ of which is connected with trolley pole 7 whilst the other is connected with the stationary contact 20$^x$.

When the dynamo-electric machine regenerates, the armature 30 of the relay closes its contact thereby short-circuiting the series winding 2 through the main contactor switch 58 and at the same time completing the circuit between trolley pole 7 and contact 20$^x$ by way of the auxiliary switch 60, thus maintaining energized the circuit already made from the same polarity by drum 22. The contactor switch 16$^x$, associated with contact 20$^x$ is mechanically connected to an auxiliary switch 16$^y$ which will close at the same time as contactor switch 16ˣ. The circuit from contact 20ˣ is continued to contact 20 by way of this auxiliary switch when contactor switch 16ˣ closes, thereby maintaining energized the circuit to the windings of contactors 16 and 16° and the main circuit to trolley pole 6.

When the dynamo-electric machine is running at speed with the controls in the position for forward running, and the power pedal is allowed to come back, the current in the shunt field winding 3 is increased so that the voltage of the dynamo-electric machine becomes higher than that of the line. Regeneration will then take place and the reverse current relay will complete the circuit from circuit 18 to contact 20ˣ by way of the contactor 60 and thence, by way of the auxiliary switch 16ʸ to contact 20, thus keeping the supplementary resistance 32 short-circuited and thereby maintaining the shunt field at full strength.

In the event of the power pedal being allowed to come back to its 'off' position, contactor switches 16ˣ, 16 and 16° will remain closed until the vehicle slows down to the speed at which regeneration ceases. The reverse current relay will now open its circuit and the contactor switches last mentioned will open, cutting off the electric power from the dynamo-electric machine.

For the purpose of stopping the vehicle on a down gradient or on the level, when regeneration is taking place a switch 18ª is provided in the exciting circuit 18. This switch is operated by the brake pedal not shown, being closed when the pedal is in its back or 'off' position. The action of applying the brake pedal immediately opens this switch which breaks the exciting circuit to all contactors, which will open and cut off all external power from the dynamo-electric machine.

There may be mechanically connected with the main contactor 58 a second auxiliary switch 59 adapted, when the relay closes its circuit during regeneration, to open and introduce a resistance 59ª into the lighting circuit 61.

Any suitable type of reverse current relay may be used in this invention and the armature may be a permanent magnet with or without an exciting coil.

Figure 3 shows an arrangement in which the electrical connections are made in such a manner that when the machine commences to regenerate the series field winding 2 is automatically cut out of circuit, so that the field maintained by the shunt winding 3 is not weakened by the demagnetizing effect of the reverse current through the series winding, which otherwise, would have taken place.

For this purpose a polarized relay is employed the heavy winding 70 of which is inserted in circuit with the end of the series winding 2 nearest the armature 1 and carries a current which varies in direction of flow accordingly as the dynamo-electric machine is acting as a generator or as a motor. The other winding 71, in which the flow of current is unidirectional, is connected in series with the shunt winding 3, or, alternatively, may be of high resistance and connected in shunt with the shunt winding. The armature 72 of this relay will close its circuit when the machine becomes a generator and open its circuit when the machine becomes a motor.

A main contactor switch 73, actuated by the relay and closing at the same time, has one terminal electrically connected with the main supply from trolley pole 6, and the other terminal connected to the junction between the heavy winding 70 of the polarized relay and the series field winding 2. By means of this arrangement it will be seen that the heavy winding of the polarized relay will remain in circuit with the armature of the dynamo-electric machine when the main contactor switch 73 is closed and the machine continues to regenerate.

For the purpose of keeping the supplementary shunt resistance 32 short-circuited and thereby ensuring the maximum field strength set up by the shunt winding 3, an auxiliary switch 74 is provided. This switch is linked to the main contactor switch 73 and arranged to close at the same time. One contact of the auxiliary switch is electrically connected to trolley pole 7 and the other contact to the stationary contact 20. The auxiliary switch when closed will therefore complete the circuit between trolley pole 7 and the contact 20 which will then have the same polarity as the controller segment 21 when the latter is in contact with the fixed contact 20ʸ and will thus maintain the excitation of the two contactors 16, 16°, which are connected in series, and keep them closed. When the machine is motoring, the auxiliary switch 74 will be automatically opened to break its circuit by the action of the main contactor switch 73.

Alternatively, instead of the polarized switch 72 acting as a relay it can be used as a main switch, completing the circuit of the armature during regeneration in the way already described, and the auxiliary switch 74 can be linked to the polarized main switch so that it can open and close at the same time and complete the circuit to stationary contact 20 in the same way as it would if linked to the contactor switch 73.

Means are preferably provided whereby the exciting circuit of the main contactor 73 can be broken in the event of any failure of the relay to function properly. For this purpose it is proposed to provide the relay circuit with a safety switch 75 adapted for operation by the mechanical brakes, said switch normally remaining closed so long as the brake is in the 'off' position but opening immediately the brake pedal is depressed.

We claim,

1. In an electrical propelled vehicle, a dynamo electric machine having an armature, a series field winding and a shunt field winding, a source of electric energy, a multi-positioned controller having a neutral position and a plurality of operating positions, said controller adapted upon the initial movement thereof to connect said machine with said source, said controller being adopted upon further movement thereof to effect acceleration of said machine, a reverse current relay associated with the terminals of said machine and responsive to the direction of the current in said armature, and means associated with said relay having an inoperative position when said machine is acting as a motor, said means being operable to maintain the initial connection effected by said controller when said machine is acting as a generator even though said controller has returned to said neutral position.

2. In an electrical propelled vehicle, a dynamo-electric machine having an armature, a series field winding and a shunt field winding, a source of electrical energy, a multi-positioned controller having a neutral position and a plurality of operating positions, said controller being adapted upon operation thereof to connect the armature of said machine to said source and to effect acceleration thereof, a reverse current relay associated with the terminals of said machine and responsive to the direction of the current in said armature, and means associated with said relay having an inoperative position when said machine is acting as a motor, said means being operable to establish a circuit shunting said armature controller and thereby maintain a connection to said source while the machine is acting as a generator even though the controller is in a neutral position.

3. In an electrically propelled vehicle, a dynamo-electric machine having an armature, a source of electrical energy, a resistor associated with said armature, a multi-positioned controller adapted to, upon initial operation thereof, connect said armature including said resistor to said source, said controller being adapted upon further operation to progressively decrease said resistance and effect acceleration of said machine, a reverse current relay associated with the terminals of said machine and responsive to the direction of the current in said armature, and means associated with said relay having an inoperative position when said machine is acting as a motor, said means being operable to maintain said initial connections when the machine is acting as a generator only when the total armature resistance has been cut out of said armature circuit.

4. In an electrically propelled vehicle a dynamo-electric machine having an armature, a series field winding and a shunt field winding, a source of electrical energy, a multi-positioned controller having a neutral position and a plurality of operating positions, said controller being adapted upon operation thereof to connect said machine to said source and to effect acceleration thereof, a reverse current relay associated with the terminals of said machine and responsive to the direction of the current in said armature, and means associated with said relay having an inoperative position when said machine is acting as a motor, said means being operable to maintain a circuit from said source through said machine when said machine is acting as a generator even though the controller is in neutral position.

SYDNEY SLATER GUY.
WILLIAM ARTHUR STEVENS.